United States Patent
Bao et al.

(10) Patent No.: US 9,008,012 B2
(45) Date of Patent: Apr. 14, 2015

(54) METHOD, SYSTEM AND APPARATUS FOR NOTIFYING A UE OF MONITORED COMPONENT CARRIERS

(75) Inventors: Wei Bao, Beijing (CN); Li Chen, Beijing (CN); Guoqing Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 804 days.

(21) Appl. No.: 13/266,758

(22) PCT Filed: Apr. 23, 2010

(86) PCT No.: PCT/CN2010/072128
§ 371 (c)(1),
(2), (4) Date: Jan. 26, 2012

(87) PCT Pub. No.: WO2010/124593
PCT Pub. Date: Nov. 4, 2010

(65) Prior Publication Data
US 2012/0113811 A1   May 10, 2012

(30) Foreign Application Priority Data

Apr. 27, 2009  (CN) .......................... 2009 1 0083064

(51) Int. Cl.
*H04W 72/04* (2009.01)
*H04L 5/00* (2006.01)
*H04W 24/00* (2009.01)

(52) U.S. Cl.
CPC .............. *H04L 5/001* (2013.01); *H04L 5/0053* (2013.01); *H04L 5/0098* (2013.01); *H04W 24/00* (2013.01)

(58) Field of Classification Search
None
See application file for complete search history.

(56) References Cited

U.S. PATENT DOCUMENTS

| | | | |
|---|---|---|---|
| 2010/0232382 A1* | 9/2010 | Gauvreau et al. | 370/329 |
| 2010/0232385 A1* | 9/2010 | Hsu | 370/329 |
| 2010/0303011 A1* | 12/2010 | Pan et al. | 370/328 |
| 2011/0002281 A1* | 1/2011 | Terry et al. | 370/329 |
| 2011/0305290 A1* | 12/2011 | Kim et al. | 375/267 |
| 2014/0016506 A1* | 1/2014 | Gauvreau et al. | 370/254 |
| 2014/0177576 A1* | 6/2014 | Lindoff et al. | 370/329 |
| 2014/0233396 A1* | 8/2014 | Marinier et al. | 370/242 |

FOREIGN PATENT DOCUMENTS

| | | |
|---|---|---|
| CN | 101189903 A | 5/2008 |
| CN | 101272177 A | 9/2008 |
| WO | 2008054310 A2 | 5/2008 |

OTHER PUBLICATIONS

ISA China, International Search Report of PCT/CN2010/072128, Jul. 15, 2010, WIPO, 4 pages.

* cited by examiner

Primary Examiner — Hassan Phillips
Assistant Examiner — Duc Duong
(74) *Attorney, Agent, or Firm* — Alleman Hall McCoy Russell & Tuttle LLP (57) ABSTRACT

The present invention provides a method for notifying a UE of monitored component carriers. The method comprises the following steps: an evolved Node B (eNB) sends an monitoring changing instruction and Component Carriers (CC) corresponding to the instruction to a UE with a Media Access Control (MAC) layer control command; according to the monitoring changing instruction and the corresponding CC, the UE activates or deactivates monitoring of the corresponding CC. The present invention allows the MAC PDU for instructing the UE to increase, decrease or change the monitored CC. Therefore, the configuration can be achieved in a simple and flexible manner and has higher reliability.

13 Claims, 5 Drawing Sheets

Fig. 1

PRIOR ART

Fig. 2

PRIOR ART

METHOD, SYSTEM AND APPARATUS FOR NOTIFYING A UE OF MONITORED COMPONENT CARRIERS

CROSS REFERENCE TO RELATED APPLICATIONS

The present application is the national phase of International Patent Application No. PCT/CN2010/072128, entitled METHOD, SYSTEM AND EQUIPMENT FOR INFORMING UE COMPONENT CARRIERS WHICH NEED TO BE MONITORED, filed Apr. 23, 2010, which in turn claims priority to Chinese Patent Application No. 200910083064.1 filed Apr. 27, 2009, the entire contents of which are incorporated herein by reference for all purposes.

FIELD OF THE INVENTION

The invention relates to the field of communication technology, in particular to a method, a system and an apparatus for notifying UE of component carriers to be monitored.

BACKGROUND OF THE INVENTION

In comparison with a Long Term Evolution (LTE), peak rates of a Long Term Evolution Advanced (LTE-A) have increased greatly, which can reach 1 Gbps of downlink and 500 Mbps of uplink. However, a single carrier can not meet this demand, so Carrier Aggregation (CA) technique is introduced into the LTE-A system. The CA technique enable multiple carriers of the same eNB, which have overlapped coverage regions in a physical space, to be aggregated for serving a UE so as to provide the serve rates which the UE needs. The respective carriers involved in the CA are referred to as Component Carrier (CC) of the UE. Furthermore, in the LTE-A system, each cell of the eNB is defined to have only one carrier. Thus, the Carrier Aggregation enables one UE transmits data to the network with resources of plural cells belonging to one eNB.

Figure 1:
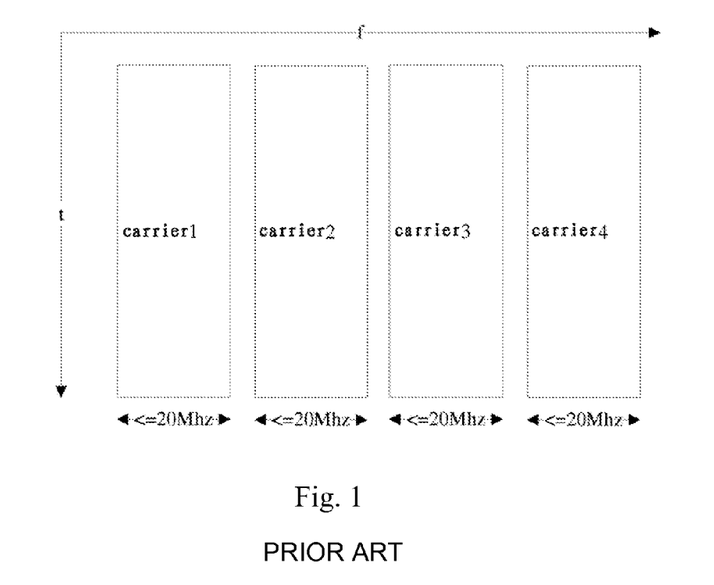
FIG. 1 is a schematic diagram showing CA technique in the LTE-A of the prior art.

In order to ensure normal operation of LTE UE in each LTE-A system, the maximum bandwidth of each carrier is required not to exceed 20 MHz in the LTE-A system. FIG. 1 is a schematic diagram showing the CA technique in the LTE-A of the prior art. As shown in FIG. 1, the eNB transmits data with the UE on four CC simultaneously so as to enhance throughput of the UE in the system.

For LTE-A and LTE UEs, there are four LTE-A cells of the eNB having the same coverage. However, for the LTE-A UE, the network can schedule resources of one or more cells for serving the UE according to the requirements of the serve rate of the UE, and for the LTE UE, the network can only schedule resources of one cell for serving the UE.

Figure 2:
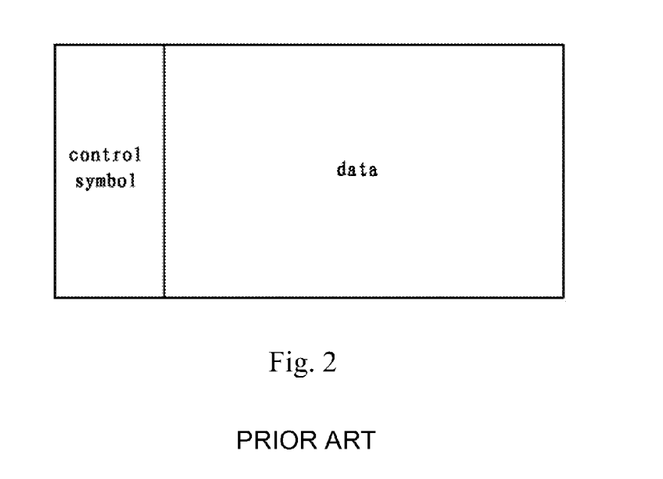
FIG. 2 is a structural diagram showing downlink subframes according to an embodiment of the present invention.

Currently, each activate UE (RRC-CONNECTED UE) in the LTE system has just one serving cell, thus the UE only needs to monitor one downlink carrier. The monitoring mechanism for the downlink carrier in the LTE system of the prior art is shown in FIG. 2. FIG. 2 is a structural diagram showing downlink subframes, each of which consists of OFDM symbols. The first 1-3 OFDM (Orthogonal Frequency Division Multiplexing) symbols of the downlink subframe are control symbols for bearing downlink control signalling. A channel bearing the downlink control signalling is referred to as PDCCH (Physical Downlink Control Channel). The rest of the OFDM symbols bear downlink data, and a physical layer channel bearing the downlink data is referred to as PDSCH (Physical Downlink Shared Channel). The control signalling may comprise: scheduling information of the present downlink subframe and a corresponding uplink subframe and the related HARQ (Hybrid Automatic Repeat Request) information etc. The UE determines whether the resources are allocated to the corresponding subframe with the received control signalling of the downlink subframe. If the resources are allocated, the UE obtains the time frequency position of the resources according to the indication of the scheduling signalling and performs data communication.

The prior art has the following disadvantages: as the CA technique is introduced into the LTE-A system, which enable the UE to configure the plurality of CC, one LTE-A UE may use a plurality of CC for data transmission simultaneously. When the LTE-A UE has to receive and send relative large amount of data, it is required to transmit data on the plurality of CC. Meanwhile, the UE monitors PDCCH and PDSCH on the plurality of CC. However, it is unnecessary to monitor the plurality of CC if there is not too much amount of data. Thus, the unused CC is stopped to receive and decode data so as to save power for the UE. When the UE has to receive and send relative large amount of data, the UE is enabled to monitor the corresponding CC.

For the LTE-A system, UE is required to monitor the carrier aggregation scheduled by the network. Therefore, the network should notify the UE that it decides to change the carriers aggregated for the LTE-A UE, so that the UE can activate or deactivate the monitoring of the corresponding CC in time. Accordingly, flexible configuration is achieved. The current LTE-A system still has no corresponding notifying mechanism.

SUMMARY OF THE INVENTION

The object of the invention is to solve one or more of the above technical defects.

In order to achieve the above object, a method is provided for notifying monitored component carriers according to an embodiment of the present invention. The method includes the following steps: an evolved Node B (eNB) sends an monitoring changing instruction and Component Carriers (CC) corresponding to the instruction to a UE with a Media Access Control (MAC) layer control command; according to the monitoring changing instruction and the corresponding CC, the UE activates or deactivates monitoring of the corresponding CC.

Furthermore, a system for notifying component carriers to be monitored is provided according to an embodiment of the present invention. The system includes a notification sending device and a notification receiving device, wherein the notification sending device is at eNB side and is configured for sending an monitoring changing instruction and CC corresponding to the instruction to a UE with a MAC layer control command; the notification receiving device is at UE side and is configured for activating or deactivating monitoring of the corresponding CC according to the monitoring changing instruction and the corresponding CC.

In addition, an notification sending device is provided according to an embodiment of the present invention, the notification sending device is at eNB side and comprises a MAC layer control command generating module and a MAC layer control command sending module, wherein the MAC layer control command generating module is configured for generating a MAC layer control command, which contains an monitoring changing instruction and CC corresponding to the instruction; and the MAC layer control command sending module is configured for sending the MAC layer control command generated by the MAC layer control command generating module to the UE.

An notification receiving device is further provided according to an embodiment of the present invention, the notification receiving device is at UE side and comprises a receiving module and a monitoring control module, wherein the receiving module is configured for receiving an monitoring changing instruction and CC corresponding to the instruction sent from the eNB with an MAC layer control command; the monitoring control module is configured for activating or deactivating monitoring of the corresponding CC according to the monitoring changing instruction and the corresponding CC.

The embodiments of the present invention allow the MAC PDU for instructing the UE to increase, decrease or change the monitored CC. Therefore, the configuration can be achieved in a simple and flexible manner and has higher reliability.

The additional aspects and advantages of the present invention will be given in the following description and a part of them become apparently from the following description or understandable through practice of the present invention.

BRIEF DESCRIPTION OF THE DRAWINGS

The above and/or additional aspects and advantages of the present invention will become apparent and easily understandable in the following description of the embodiments in conjunction with the accompanying drawings, in which.

DETAILED DESCRIPTION OF THE PRESENT INVENTION

The embodiments of the present invention are described in detail in the following, and all examples of the embodiments are shown in the accompanying drawings, wherein the same or similar reference numbers represent the same or similar elements or elements having same or similar function throughout. The embodiments will be described as examples with reference to the accompanying drawings in the following and are only used for explaining, rather than being construed as limiting the present invention.

The present invention is mainly to introduce a new MAC PDU for instructing the UE to increase, decrease or change the monitored CC. Therefore, the configuration can be achieved in a simple and flexible manner and has higher reliability.

In order to understand the present invention completely, a basic structure and characteristics of the MAC PDU (Media Access Control Protocol Data Unit) will be described simply in the following.

Figure 3:
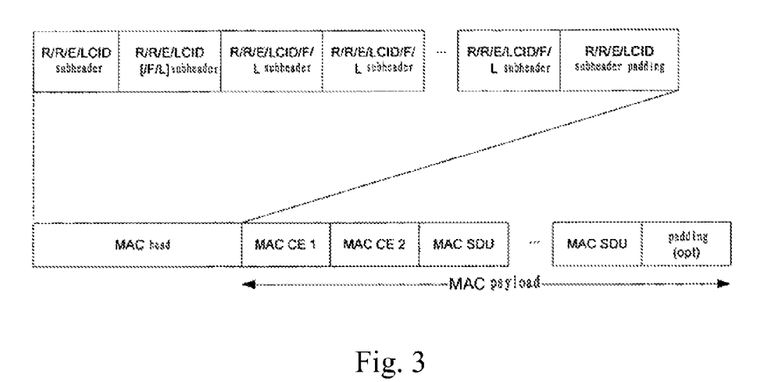
FIG. 3 is schematic structural diagram showing MAC PDU according to an embodiment of the present invention.
Figure 4:
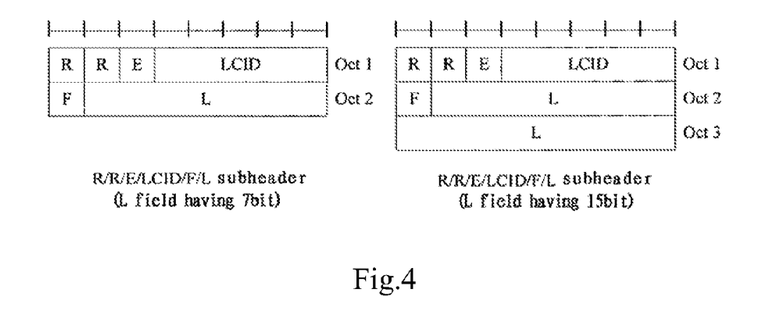
FIGS. 4 and 5 are schematic diagrams showing MAC subheaders with two formats in the LTE system according to an embodiment of the present invention.
Figure 5:
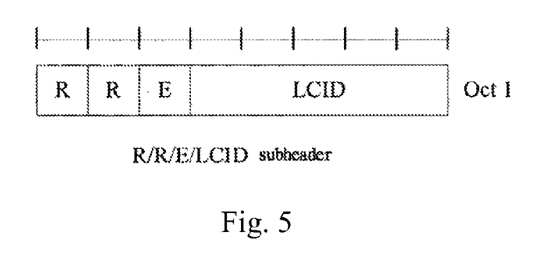

FIG. 3 is schematic structural diagram showing MAC PDU according to an embodiment of the present invention. As shown in FIG. 3, one MAC PDU may comprise a MAC head, a MAC SDU, a MAC CE (MAC Control Element) and padding. The MAC head is formed of one or more MAC subheaders. The MAC subheaders, the MAC SDU and the MAC CE all require byte alignment, and the lengths of the MAC head and MAC SDU are variable. One MAC head includes one or more MAC subheaders, each of which corresponds to one MAC SDU, MAC CE or padding. A MAC control command includes the MAC subheader and the MAC CE. As shown in FIGS. 4 and 5, the MAC subheaders of the LTE system may have two formats. The MAC subheaders are configured for indicating a type and a length of the corresponding MAC CE or MAC SDU. An LCID (Logical Channel ID) field is configured for identifying the type of the MAC CE and the logical channel to which a MAC SDU belongs. An L field is configured for indicating the length of the corresponding MAC CE or MAC SDU. MAC CE is configured for bearing a control message. The MAC CE is defined as a fixed format in the LTE system, and the length is an integral number of bytes.

Figure 6:
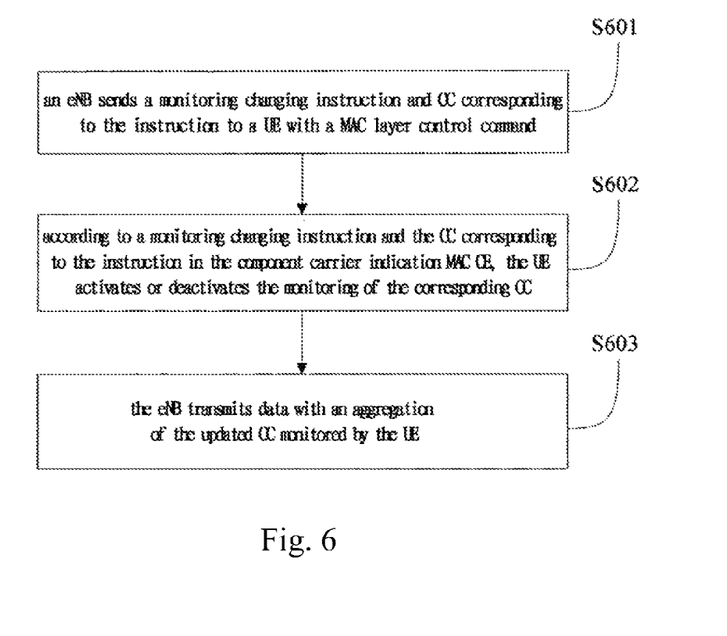
FIG. 6 is a flowchart showing a method for notifying the component carriers to be monitored according to an embodiment of the present invention.

FIG. 6 is a flowchart showing a method for notifying the component carriers to be monitored according to an embodiment of the present invention, wherein the method comprises the following steps:

Step S601, an eNB sends a monitoring changing instruction and CC corresponding to the instruction to a UE with a MAC layer control command.

In one embodiment of the present invention, the eNB adds one MAC CE, which is referred to as a component carrier indication MAC CE in the following embodiments and bears the instruction and the corresponding CC, into the MAC PDU, and adds an identifier indicating existence of the MAC CE in a MAC head of the MAC PDU. The eNB can send the component carrier indication MAC CE to the UE on any activated CC, and the priority of the component carrier indication MAC CE is higher that of the MAC SDU. The specific command for changing monitoring and CC may be determined by the eNB based on the data of the UE to be transmitted. For example, if there are so many data to be transmitted, then the number of the CC for being monitored by the UE will increase, vice versa.

Figure 8:
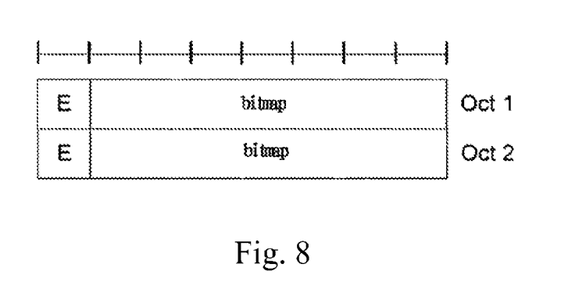
FIG. 8 is a structural diagram showing component carrier indication MAC CE according to another embodiment of the present invention.

In an embodiment of the present invention, the identifier for indicating the existence of the component carrier indication MAC CE may added into the MAC head of the MAC PDU in many manners. For example, the MAC subheaders corresponding to the component carrier indication MAC CE may be added into the MAC head in one embodiment of the present invention, and the LCID in the MAC subheaders is the identifier for indicating the existence of the component carrier indication MAC CE. In particular, after the component carrier indication MAC CE has been introduced, an independent LCID, which may be a reserved LCID value, is defined to indicate the corresponding MAC CE as the component carrier indication MAC CE. If the LCID indicates types of the MAC CE, each type of the MAC CE corresponds to one possible value in LCID field. In this embodiment, the reserved LCID value corresponds to the component carrier indication MAC CE in the present invention so as to indicate the existence of the component carrier indication MAC CE. If the length of the component carrier indication MAC CE is fixed or can be indicated by itself (as illustrated by FIG. 8), then the format of the MAC subheader shown in FIG. 5 is used, otherwise the format of the MAC subheader shown in FIG. 4 is used.

In another embodiment of the present invention, the identifier, which indicates the existence of the component carrier indication MAC CE, is defined in another manner. The first MAC subheader of the MAC head bears this identifier, and the component carrier indication MAC CE locates in initial position of MAC PDU payload. That is, one R bit of the subheader corresponding to other MAC CE and MAC SDU in the MAC SDU indicates the existence of the component carrier indication MAC CE, thus one byte of the MAC subheader is saved. For example, in this embodiment, if the component carrier indication MAC CE appears in the MAC PDU, then it must locate at the initial position of the MAC payload, and the first R bit of the first MAC subheader in the MAC PDU indicates whether the component carrier indication MAC CE exists in this MAC PDU. If the first R bit of the first MAC subheader in the MAC PDU is 1, then the first MAC CE in the MAC load is the component carrier indication MAC CE, otherwise there is no component carrier indication MAC CE in the MAC PDU.

However, the above two embodiments are alternative examples for adding the identifier for indicating the existence of the component carrier indication MAC CE. A person skilled in the art can realize that the identifier for indicating the existence of the component carrier indication MAC CE is added in other manners.

Similarly, the present invention also provides the component carrier indication MAC CE with various formats. For example, in one embodiment, the component carrier indication MAC CE has a fixed length. Each CC available for the UE corresponds to one bit of its component carrier indication MAC CE, the value of which is a command for the CC operation. If the bit is 1, it represents the carrier is activated. If the bit is 0, it represents the corresponding carrier is deactivated. Alternatively, if the bit is 0, it represents the carrier is activated. If the bit is 1, it represents the corresponding carrier is deactivated.

The component carrier corresponding to each bit is sequenced according to one of the following factors: cell levels, UE levels, frequencies from low to high or frequencies from high to low.

Figure 7:
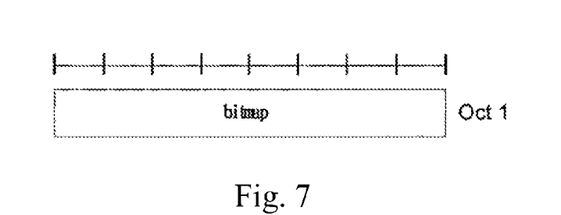
FIG. 7 is a structural diagram showing component carrier indication MAC CE according to an embodiment of the present invention.

Particularly, FIG. 7 is a structural diagram showing component carrier indication MAC CE according to an embodiment of the present invention. As shown in FIG. 7, the component carrier indication MAC CE may have fixed length, which depends upon the maximum number N of the aggregated carriers allowable to be supported by the current cell or the LTE-A system. For example, if N<=8, then the length of the component carrier indication MAC CE is set to 1 byte. If 8<N<=16, then the length of the component carrier indication MAC CE is set to 2 bytes. If 16<N<=24, then the length of the component carrier indication MAC CE is set to 3 bytes, and so on. In this embodiment, the CC, which needs to be activated and deactivated, is indicated in the form of bitmap for the LTE-A UE. For example, the bitmap of the first byte corresponds to 0-7 CC and the bitmap of the second byte corresponds to 8-15 CC etc. If the bit is set to 1 in the bitmap, then the UE is required to activate the monitoring of the CC corresponding to the bit, otherwise, the UE deactivates the monitoring of the CC corresponding to the bit. Obviously, the above component carrier indication MAC CE having the fixed length is described as the embodiment of the present invention. The component carrier indication MAC CE may have a variable length indicated by the corresponding MAC subheader.

According to another embodiment of the present invention, the component carrier indication MAC CE has a variable length, and the first bit of each byte in the component carrier indication MAC CE indicates whether a subsequent byte belongs to the component carrier indication MAC CE, wherein each CC available for the UE corresponds to one of other bits in this byte a value of which is the command for the CC operation. For example, FIG. 8 is a structural diagram showing component carrier indication MAC CE according to another embodiment of the present invention. In this embodiment, the component carrier indication MAC CE has the variable length, and the length of the MAC CE is indicated by E bit. If the E bit is 1, then it represents that the subsequent byte also belongs to this component carrier indication MAC CE. If the E bit is 0, then it represents that the current byte is the last byte of this component carrier indication MAC CE. In this embodiment, except for E byte, the rest fields are bitmaps. The bitmap of the first byte corresponds to 0-6 CC, and the bitmap of the second byte corresponds to 7-13 CC, etc. If the bit is set to 1 in the bitmap, then the UE is required to activate the monitoring of the CC corresponding to this bit, otherwise, the UE should deactivate the monitoring of the CC corresponding to this bit.

S602, according to a monitoring changing instruction and the CC corresponding to the instruction in the component carrier indication MAC CE, the UE activates or deactivates the monitoring of the corresponding CC. Meanwhile, an eNB is also required to update monitoring records of the corresponding UE. In particular, the eNB updates the monitoring records of the UE according to the sent component carrier indication MAC CE to ensure that the records of the CC, which is monitored by the UE, at the UE side are consistent with those at network side.

S603, the eNB transmits data with a set of the updated CC monitored by the UE.

In one preferred embodiment of the present invention, after the eNB has sent the component carrier indication MAC CE and the UE has received it, if the monitoring changing instruction of the component carrier indication MAC CE indicates the deactivation, then it also needs to determine whether Hybrid Automatic Repeat Request is being retransmitted on the CC corresponding to this instruction. If the HARQ is being retransmitted on the CC corresponding to the instruction, then the eNB and the UE deactivate the corresponding CC after the HARQ retransmission.

Figure 9:
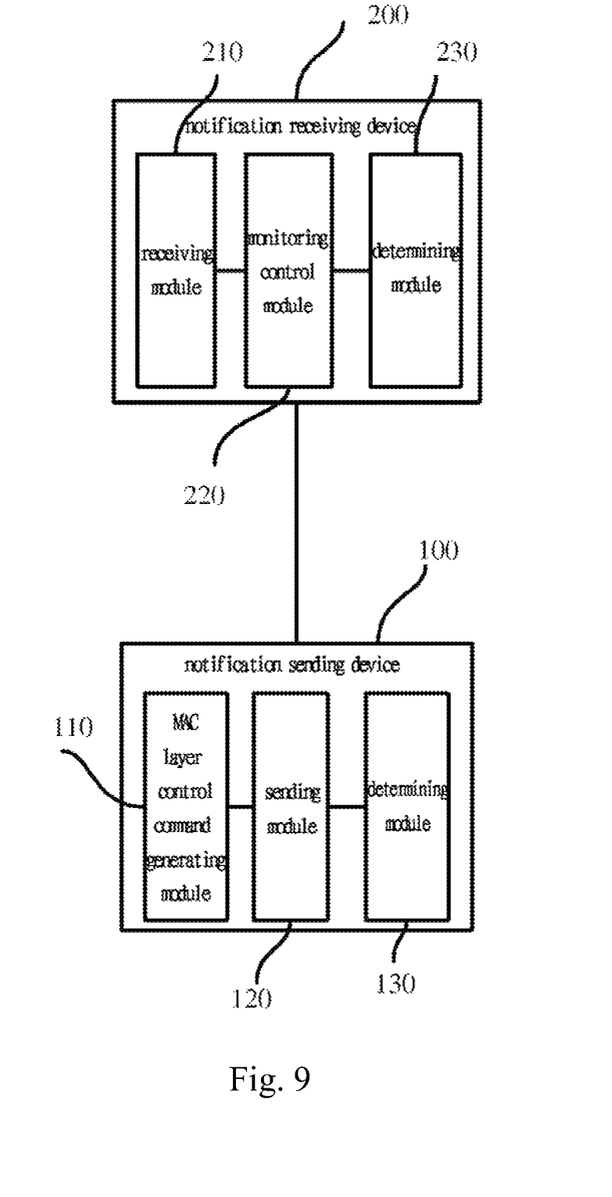
FIG. 9 is a structural diagram showing a system for notifying component carriers to be monitored according to an embodiment of the present invention.

FIG. 9 is a structural diagram showing a system for notifying component carriers to be monitored according to an embodiment of the present invention. The system includes a notification sending device 100 and a notification receiving device 200. The notification sending device 100 is at eNB side and is configured for sending a monitoring changing instruction and CC corresponding to the instruction to UE with a MAC layer control command. The notification receiving device 200 is at the UE side and is configured for activating or deactivating the monitoring of the corresponding CC according to the monitoring changing instruction and the corresponding CC.

The notification sending device 100 comprises a MAC layer control command generating module 110 and a sending module 120. The MAC layer control command generating module 110 is configured for generating a MAC layer control command, which contains a monitoring changing instruction and CC corresponding to the instruction. The sending module 120 is configured for sending the MAC layer control command generated by the MAC layer control command generating module 110 to UE.

In one embodiment of the present invention, the MAC layer control command generating module 110 adds the component carrier indication MAC CE, which bears the instruction and the corresponding CC, into the MAC PDU, and adds an identifier indicating existence of the MAC CE in a MAC head of the MAC PDU. In particular, the MAC layer control command generating module 110 can add the MAC subheader corresponding to the component carrier indication MAC CE into the MAC head, the LCID in the MAC subheaders is the identifier for indicating the existence of the component carrier indication MAC CE. The first MAC subheader of the MAC head bears this identifier, and the component carrier indication MAC CE locates in initial position of MAC PDU payload. In one embodiment of the present invention, the component carrier indication MAC CE has the fixed length. Each CC available for the UE corresponds to one bit of its component carrier indication MAC CE, the value of which is a command for the CC operation. If the bit is 1, it represents the carrier is activated. If the bit is 0, it represents the corresponding carrier is deactivated. Alternatively, if the bit is 0, it represents the carrier is activated. If the bit is 1, it represents the corresponding carrier is deactivated.

According to another embodiment of the present invention, the component carrier indication MAC CE has a variable length, and the first bit of each byte in the component carrier indication MAC CE indicates whether a subsequent byte belongs to the component carrier indication MAC CE, wherein each CC available for the UE corresponds to one of other bits in this byte a value of which is the command for the CC operation.

Figure 10A:
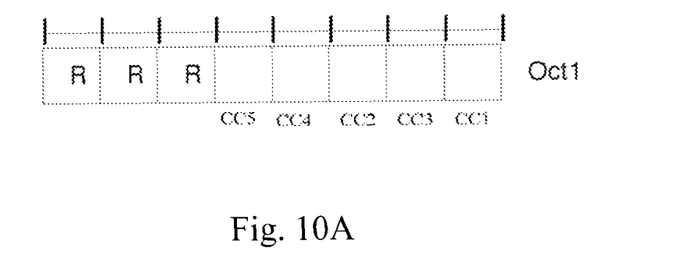
FIGS. 10A to 10D are schematic diagrams showing corresponding relation between respective bits of MAC CE and component carriers according to an embodiment of the present invention.
Figure 10B:
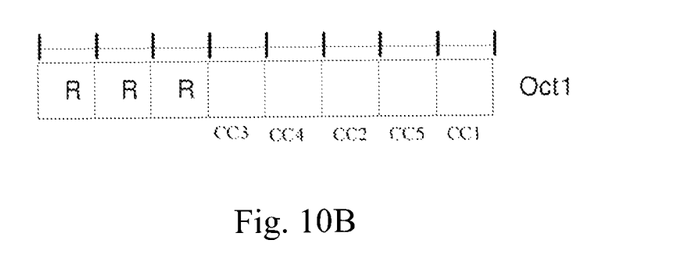
Figure 10C:
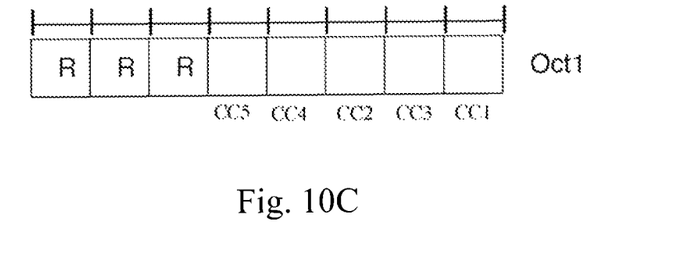
Figure 10D:
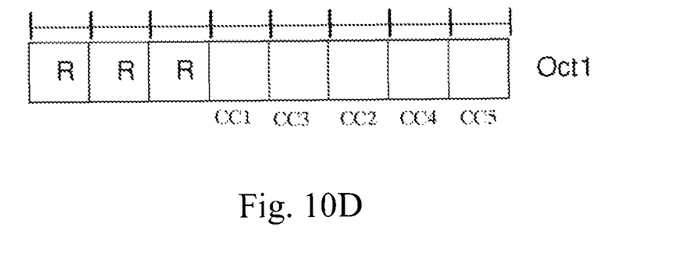

According to one embodiment of the present invention, DRX MAC CE bitmap is specified as follows:

Given that the UE aggregates five CC, which are respectively marked as: CC1/CC2/CC3/CC4/CC5. The CC corresponds to 1, 3, 2, 4 and 5 respectively according to cell levels. The CC corresponds to 1, 3, 5, 4 and 2 respectively according to UE levels. The CC is sequenced as CC1/CC3/CC2/CC4/CC5 according to the frequency points from low to high. Thus, bitmaps of the carrier activating/deactivating MAC CE have the following formats:

if CC is sequenced according to the cell levels, then the corresponding relation between the respective bits and CC of the carrier activating/deactivating MAC CE is shown in FIG. 10A.

if CC is sequenced according to the UE levels, then the corresponding relation between the respective bits and CC of the carrier activating/deactivating MAC CE is shown in FIG. 10B.

if CC is sequenced according to the frequencies from low to high, then the corresponding relation between the respective bits and CC of the carrier activating/deactivating MAC CE is shown in FIG. 10C.

if CC is sequenced according to the frequencies from high to low, then the corresponding relation between the respective bits and CC of the carrier activating/deactivating MAC CE is shown in FIG. 10D.

In FIGS. 10A to 10D, R represents unused bits or reserved bits.

The notifying sending module 100 also includes a determining module 130, which is configured for determining whether HARQ retransmission is performing on the CC corresponding to an instruction when the changing monitoring instruction is a deactivating instruction. If the HARQ retransmission is performing, the corresponding CC is deactivated after it.

The notification receiving device 200 comprises a receiving module 210 and a monitoring control module 220. The receiving module 210 is configured for receiving the monitoring changing instruction and CC corresponding to the instruction sent from the eNB 100 with the MAC layer control command. The monitoring control module 220 is configured for activating or deactivating the monitoring of the corresponding CC according to the monitoring changing instruction and the corresponding CC.

The notification receiving device 200 also includes a determining module 230, which is configure for determining whether HARQ retransmission is performing on the CC corresponding to an instruction when the changing monitoring instruction is a deactivating instruction. If the HARQ retransmission is performing, the corresponding CC is deactivated after it.

The present invention allows the MAC PDU for instructing the UE to increase, decrease or change the monitored CC. Therefore, the configuration can be achieved in a simple and flexible manner and has higher reliability.

Whereas the embodiments of the present invention have been shown and described, for a person skilled in the art, it is to be understood that these embodiments can be subjected to various changes, modifications, replacements and deformations without departing from the principle and spirits of the present invention, and the scope of the present invention is limited by the appended claims and their equivalents.

The invention claimed is:

1. A method for notifying a UE of monitored component carriers, comprising the following steps:
   an eNB sending a monitoring changing instruction and Component Carrier corresponding to the instruction to the UE with a MAC layer control command;
   the UE activating or deactivating monitoring of the corresponding CC according to the monitoring changing instruction and the CC corresponding to the instructions;
   wherein the step of the eNB sending the monitoring changing instruction and the CC corresponding to the instruction to the UE with the MAC layer control command comprises the eNB adding one MAC CE, which bears the instruction and the corresponding CC, into the MAC PDU, and adding an identifier indicating existence of the MAC CE in a MAC head of the MAC PDU; and
   wherein the step of adding an identifier indicating existence of the MAC CE in a MAC head of the MAC PDU comprises: (1) adding a MAC subheader corresponding to the MAC CE into the MAC head, and LCID in the MAC subheader is an identifier for indicating the existence of the MAC CE; or (2) the first MAC subheader of the MAC head bearing the identifier, and the MAC CE locating an initial position of MAC PDU payload.

2. The method of claim 1, wherein the MAC CE has a fixed length, wherein each CC available for the UE corresponds to one bit of the MAC CE, a value of which is a command for the CC operation, wherein if the bit is 1, then it represents the carriers are activated, and if the bit is 0, then it represents the carriers are deactivated, or, if the bit is 0, it represents the carriers are activated, and if the bit is 1, it represents the carriers are deactivated; or
   the component carriers corresponding to each bit are sequenced according to one of the following factors:
   cell levels, UE levels, frequencies from low to high and frequencies from high to low.

3. The method of claim 1, wherein the MAC CE has a variable length, and the first bit in each byte of the MAC CE is configured for indicating whether a subsequent byte belongs to the MAC CE, and each CC available for the UE corresponds to one of other bits in the byte, a value of which is a command for the CC operation; or the MAC CE has a variable length, which is indicated by a MAC subheader corresponding to the MAC CE, and each CC available for the UE corresponds to one bit in the MAC CE, a value of which is a command for the CC operation.

4. The method of claim 1, wherein if the monitoring changing instruction is a deactivating instruction and a Hybrid Automatic Repeat Request HARQ retransmission is performing on the CC corresponding to the instruction, then the eNB and the UE deactivate the CC after the HARQ retransmission.

5. A notification sending device, comprising a MAC layer control command generating module and a sending module, wherein the MAC layer control command generating module is configured for generating a MAC layer control command, which contains a monitoring changing instruction and CC corresponding to the instruction;

the sending module is configured for sending the MAC layer control command generated by the MAC layer control command generating module to a UE;

wherein the MAC layer control command generating module adds a MAC CE, which bears the instruction and the corresponding CC, into the MAC PDU, and adds an identifier for indicating existence of the MAC CE in a MAC head of the MAC PDU and wherein the MAC layer control command generating module adds a MAC subheader corresponding to the MAC CE into the MAC head, and LCID of the MAC subheader is an identifier for the existence of the MAC CE; or the first MAC subheader of the MAC head bears the identifier, and the MAC CE locates an initial position of MAC PDU payload.

6. The notification sending device of claim 5, wherein the MAC CE has a fixed length, wherein each CC available for the UE corresponds to one bit of the MAC CE, the value of which is a command for the CC operation, wherein if the bit is 1, then it represents the carriers are activated, and if the bit is 0, then it represents the carriers are deactivated, or, if the bit is 0, it represents the carriers are activated, and if the bit is 1, it represents the carriers are deactivated; or the component carriers corresponding to each bit are sequenced according to one of the following factors:

cell levels, UE levels, frequencies from low to high and frequencies from high to low.

7. The notification sending device of claim 5, wherein the MAC CE has a variable length, and the first bit in each byte of the MAC CE is configured for indicating whether a subsequent byte belongs to the MAC CE, and each CC available for the UE corresponds to one of other bits in the byte, a value of which is a command for the CC operation; or the MAC CE has a variable length, which is indicated by a MAC subheader corresponding to the MAC CE, and each CC available for the UE corresponds to one bit in the MAC CE, a value of which is a command for the CC operation.

8. The notification sending device of claim 5, further comprising a determining module for determining whether a HARQ retransmission is performed on the CC corresponding to the instruction if the monitoring changing instruction is a deactivating instruction, and deactivating the CC after the HARQ retransmission if the HARQ retransmission is performed.

9. A notification receiving device, comprising a receiving module and a monitoring control module, wherein the receiving module is configured for receiving a monitoring changing instruction and CC corresponding to the instruction sent from an eNB with a MAC layer control command;

the monitoring control module is configured for activating or deactivating the monitoring of the corresponding CC according to the monitoring changing instruction and the corresponding CC;

wherein the MAC PDU comprises a MAC CE, which bears the instruction and the corresponding CC, and a MAC head of the MAC PDU comprises an identifier for indicating existence of the MAC CE; and wherein the MAC head comprises a MAC subheader corresponding to the MAC CE, LCID of which is an identifier for indicating the existence of the MAC CE; or the first MAC subheader of the MAC head bears the identifier, and the MAC CE locates in initial position of MAC PDU payload.

10. The notification receiving device of claim 9, wherein the MAC CE has a fixed length, wherein each CC available for the UE corresponds to one bit of the MAC CE, the value of which is a command for the CC operation.

11. The notification receiving device of claim 10, wherein if the bit is 1, then it represents the carriers are activated, and if the bit is 0, then it represents the carriers are deactivated; or, if the bit is 0, it represents the carriers are activated, and if the bit is 1, it represents the carriers are deactivated.

12. The notification receiving device of claim 9, wherein the MAC CE has a variable length, and the first bit in each byte of the MAC CE is configured for indicating whether a subsequent byte belongs to the MAC CE, and each CC available for the UE corresponds to one of other bits in the byte, a value of which is a command for the CC operation; or the MAC CE has a variable length, which is indicated by a MAC subheader corresponding to the MAC CE, and each CC available for the UE corresponds to one bit in the MAC CE, a value of which is a command for the CC operation.

13. The notification receiving device of claim 9, further comprising a determining module for determining whether a HARQ retransmission is performing on the CC corresponding to the instruction if the monitoring changing instruction is a deactivating instruction, and deactivating the CC after the HARQ retransmission if the HARQ retransmission is performing.

* * * * *